April 8, 1930.  E. D. RALPH  1,753,965
APPARATUS AND METHOD OF MAKING DENTURES
Filed Feb. 26, 1927  3 Sheets-Sheet 1
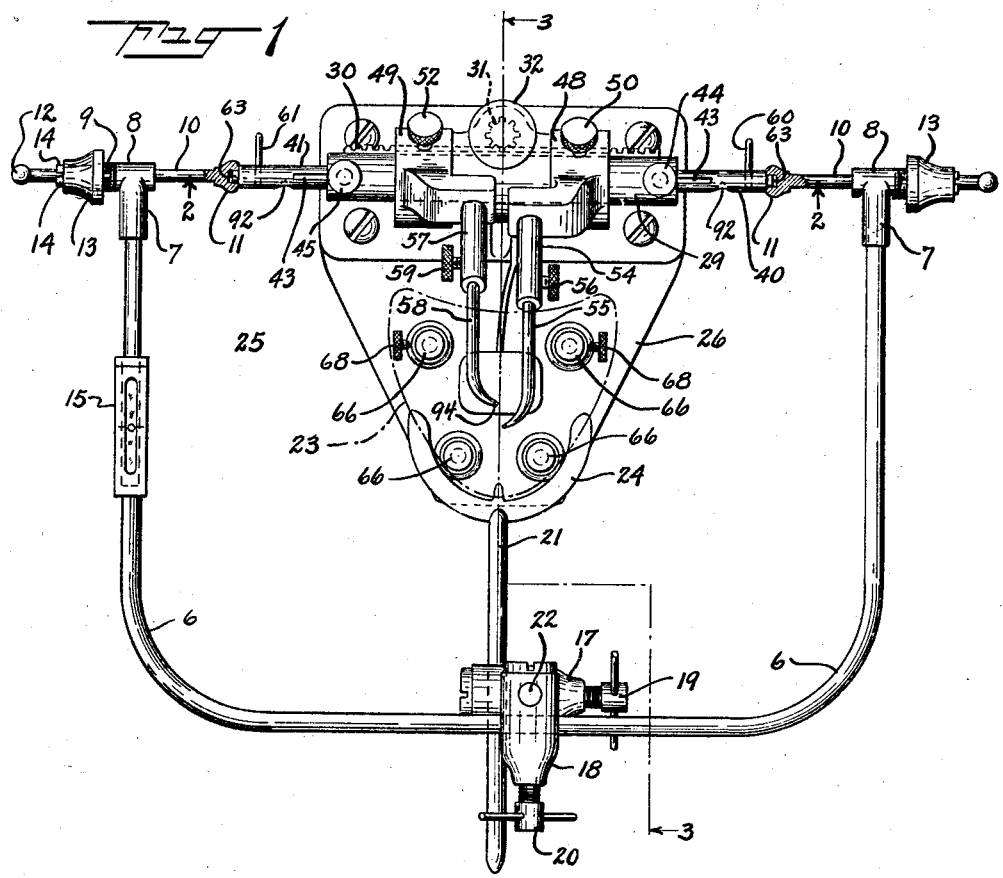
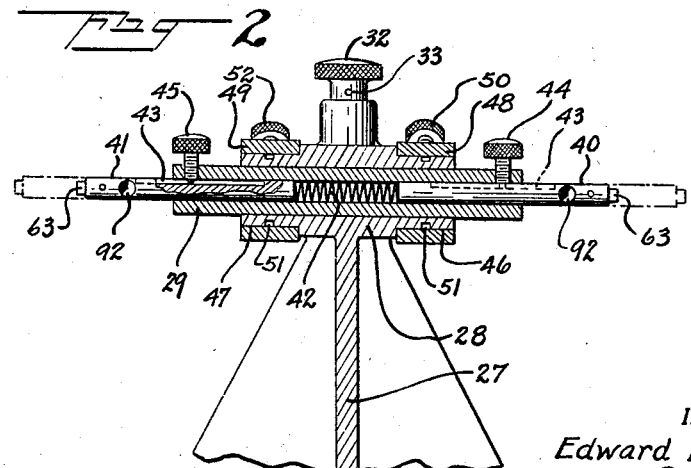
INVENTOR.
Edward D. Ralph
BY
ATTORNEYS.

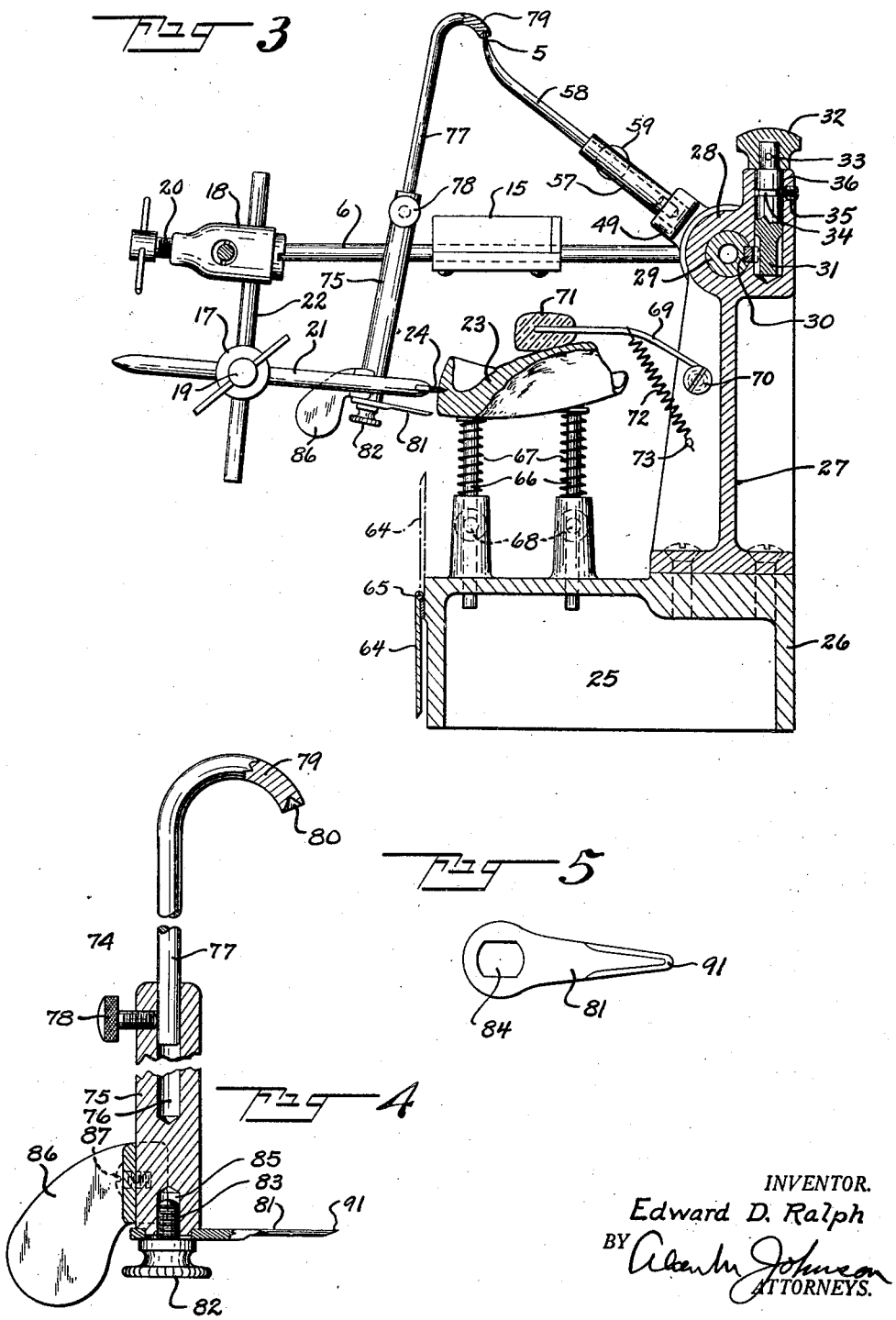

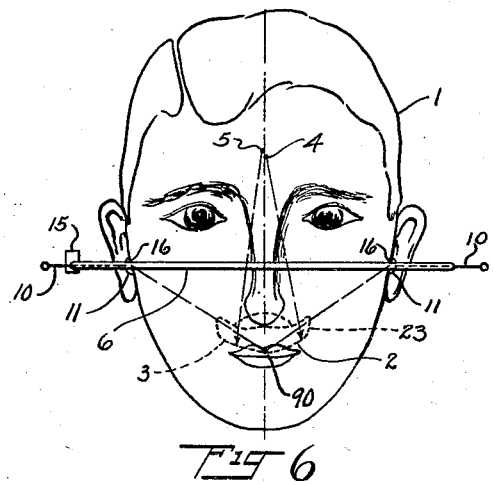
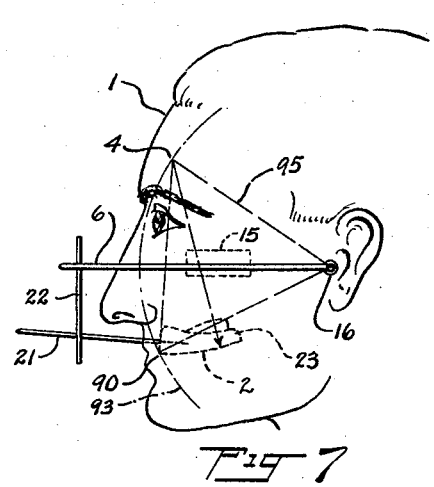
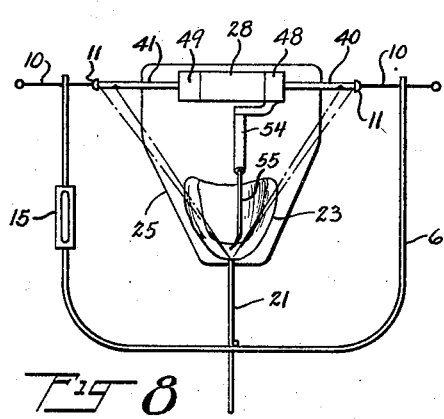
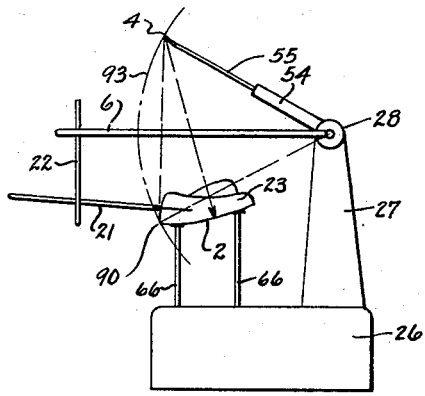
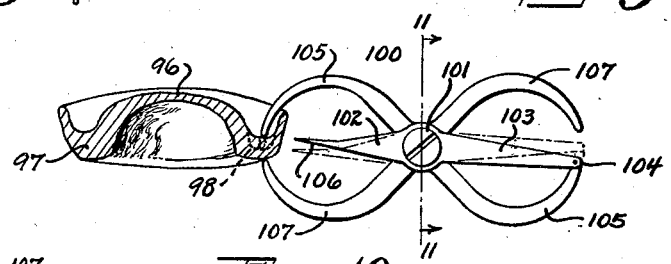
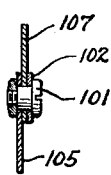
INVENTOR.
Edward D. Ralph.
BY
ATTORNEYS.

Patented Apr. 8, 1930

1,753,965

UNITED STATES PATENT OFFICE

EDWARD D. RALPH, OF FLORAL PARK, LONG ISLAND, NEW YORK

APPARATUS AND METHOD OF MAKING DENTURES

Application filed February 26, 1927. Serial No. 171,225.

My invention relates to the art of dentistry and more particularly to the manufacture of artificial dentures.

My invention further relates to the method of forming the curve or plane of Spee directly on the bite wax. My invention further relates to the method and to the apparatus for carrying out that method whereby the cutting tool is held in fixed relation to the center of the Spee curve.

My invention further relates to certain articles of manufacture, combinations, sub-combinations, details of construction, methods and sub-methods to be more fully hereinafter described and pointed out in the claims.

In the accompanying drawings the same reference numerals refer to similar parts in the several figures.

Fig. 1 is a plan view of one form of apparatus which I may employ to carry out my improved method;

Fig. 2 is a vertical section on the line 2—2 of Fig. 1, which is the line in the machine corresponding to the condyle axis;

Fig. 3 is a vertical section on the staggered section line 3—3 of Fig. 1, showing the bite wax mounted in my apparatus and the curve or plane of Spee having been cut;

Fig. 4 is a vertical section, on an enlarged scale, of one form of combined gauge and cutter, which I may use to cut the curve or plane of Spee in the bite wax;

Fig. 5 is a plan detailed view of one form of cutter, which in this case is a knife;

Fig. 6 is a front diagram showing the first setting of parts of my apparatus;

Fig. 7 is a side elevation of the head of the person for whom the dentures are to be made. This view shows among other features the curve of Spee and the center of the circle of which the Spee curve is a segment;

Fig. 8 is a diagrammatic plan view of the bite wax removed from the mouth of the patient and set up or set in the particular form of apparatus illustrated in this case by way of example;

Fig. 9 is a side elevation of the view shown in Fig. 8;

Fig. 10 is a side elevation of a measuring instrument shown in combination with a section of bite wax, said instrument being used in cases where the jaw of the patient is irregular;

Fig. 11 is a vertical section on the line 11—11 of Fig. 10.

That my invention may be more readily understood it is common practice in this art for a patient to bite into the bite wax and then the wax is carved by hand, in a sort of free-hand carving, by trial and error, ofter requiring the bite wax to be built up with new wax when it has been over-carved to get the curve of Spee. As now practiced by the best practitioners it is a very difficult and tedious procedure requiring fine technique and skill to accurately cut the bite wax to the correct curve of Spee for the particular patient, it being understood that this curve will vary for each patient and will vary for each side of the mouth for each patient.

In fact the technique is so complicated and tedious and requires so much time that it is common practice to obtain this curve of Spee approximately; so that when the patient calls again corrections are made for the conditions encountered. Frequently another visit is necessary before the practitioner will correctly obtain the curve or plane of Spee. It is also well-known that the axial inclination of the teeth of each patient will vary on each side of the mouth. Even with the most skilled and best practitioners a patient will have to make several visits to the dentist and his bite wax will have to be sent several times to the laboratory preparatory to making the final plate.

I insure that a practitioner, with very little skill, following my method and apparatus, can correctly and accurately form or cut the curve or plane of Spee in the bite wax, so that at least two visits by the patient to the dentist are eliminated. Two workings on the bite wax in the laboratory are also eliminated. This saves several hours in the manufacture of the dentures. In other words by following my method and apparatus the occlusal plane and its component factors are speedily, accurately and decisively determined, so that the curve or plane of Spee may be quickly made, in a very few minutes, while the patient waits. This permits a check-up to be made in the mouth of the patient directly, all of which is impossible by any other known method.

The waxes carved or cut by my method and apparatus may be used in any articulator now on the market. This is especially important in anatomical restorations as it not only gives curvature of the curve of Spee in its buccal aspect, but also in its lingual aspect, thereby eliminating many hours of tedious work in placing the teeth in the plates with the correct angle of axial inclination, which as I have previously stated vary with each patient, and on each side of the jaw of each patient.

Various forms of apparatus may be employed to carry out my method. I have shown by way of illustration one form but it is to be understood that my invention is not to be limited to the particular form illustrated.

That my invention may be more readily understood I will first refer to the diagrammatic Figures 6, 7, 8 and 9. In these figures, 1 is the patient, and the two curves or planes of Spee are represented, respectively, by dotted lines 2 and 3; the center of the curve of Spee 2 being the imaginary point 4, and the center of the curve of Spee 3 being the imaginary point 5. It will be noted that these two centers 4 and 5 do not coincide because the arc or curve of Spees 2 and 3 are different. It is well known, as previously pointed out, that these curves of Spee will vary in each patient, and on each side of the mouth.

To determine the condyle axis of the particular patient, the face bow 6 is adjusted on the patient as shown in Figs. 6 and 7. This face bow is provided with a fitting 7 having a hollow bearing 8 split or slotted at 9 within which is mounted a slide rod 10, having an abutment 11, the other end of the rod 10 having a handle 12. A conical nut 13 is mounted upon the screw-threaded end of the bearing 8 so that as it is screwed home the ends of the bearings 14, 14 will be compressed and frictionally hold the rod 10 in any set position (see Fig. 1). Each arm of the face bow 6 carries one of the sliding rods 10 with the component parts previously described the same being duplicates. Preferably, I also mount on one of the arms of the face bow 6 a spirit level 15 for a purpose to be more fully described hereinafter.

The face bow, which is shown in Fig. 1 in connection with the machine, is applied to the patient 1 as shown in Fig. 6. The abutments 11, 11 are pressed in on the two condyles 16, 16 of the jaw of the patient as shown in Figs. 6 and 7. The line connecting the abutments 11, 11 and running through the head of the patient is the condyle axis, which will be more fully hereinafter described in connection with the machine. Face bows, of course, are not new, as there are different forms on the market.

On the face bow 6 I mount the usual chucks 17 and 18 having the respective screw adjustments 19, 20 to provide a universal joint for the bite holder 21. The vertical rod 22 is mounted in the chucks 17 and 18 and secured by the adjusting screws 19 and 20.

At the same time, or prior to the setting of the face bow 6, the usual bite wax 23, which is a correct impression of the upper jaw, is placed in the mouth of the patient, who closes his jaws upon it. When the spirit level indicates that the bow is horizontal, the yoke 24 of the bite wax holder 21 is then secured in the bite wax 23, while still in the mouth of the patient in any suitable manner; usually it is heated so that it can be readily forced into the bite wax.

To insure the same setting of the bite wax in my machine, as when the patient bit into it, the face bow 6 is manipulated until the level 15 indicates that the face bow is horizontal.

The bite wax 23 now rigidly secured, at the proper angle to the face bow 6 by means of the bite holder 21, is then removed from the mouth of the patient, the abutments 11, 11 at the same time slipping off of the face of the patient.

It is then necessary to mount the face bow in my apparatus 25, Fig. 3, in exactly the same manner as it was mounted in the face of the patient. In the form of my apparatus shown, the base plate 26 has secured to it a standard 27 with a boss 28 within which is mounted a sliding tube 29 in the back of which is secured a rack 30, the teeth of which cooperate with the pinion 31 actuated by means of a thumb nut 32, which is secured to the pinion by means of pin 33. The pinion is provided with a circumferential groove 34 cooperating with a screw 35 having a reduced portion 36, which fits into the groove 34. It will be clear that by rotating the thumb nut 32, in either direction, it will actuate the pinion 31 and the rack 30, thereby moving the tube 29 to the right or left of the machine, as the case may be. It will also be noted that the rack 30 will prevent the rotation of the tube 29.

Mounted in the tube 29, Fig. 2, are two slide rods 40, 41 pressed apart by a more or less weak coil spring 42. Each one of these rods 40 and 41 is provided with a groove 43 to limit both rotation and longitudinal movement, the grooves cooperating with the reduced ends of the respective set screws 44 and 45. On the boss 28 are two reduced bearings 46, 47 upon which are respectively mounted arms 48 and 49, the arm 48 cooperating with a set screw 50, having a reduced portion (not shown) adapted to take into the circumferential groove 51 in the bearing 46. The other bearing 47 is also provided with a circumferential groove 51 which cooperates with the end (not shown) of the set screw 52. The arm 48 (Fig. 1) is provided with a hollow extension 54 in which is mounted a rod 55 secured in position by the set screw 56. The other arm 49 is provided with a similar hollow extension 57 within which is adjusted a rod 58 held in position by the set screw 59.

After the face bow 6, with its rigidly held bite wax 23 is taken from the patient 1, it is brought over to my apparatus 25 and fitted to my apparatus by compressing the two slide rods 40 and 41 by moving them towards each other, in any suitable manner as by pressing the pins 60, 61 towards each other, thereby compressing the spring 42. It will be necessary to compress these slide rods a sufficient amount so that when the hollow abutments 11 are brought adjacent to the reduced ends 63, 63 of said rods, and the pins 60 and 61 are released these ends will become seated in the respective abutments 11, 11 by the action of the spring 42. In the mechanism so far described the slide rods, with their appurtenant parts, correspond with the condyle axis of the patient.

While the bite wax 23 was in the mouth of the patient a mark was made upon it indicating the center of the patient's head also a transverse mark across this center line, indicating the tooth length. This intersection of these lines giving a point called the mesio-incisal point.

In transferring the bite wax to the apparatus this point in the bite wax must be in a line with the center of the machine. That this may be more readily done, I provide the base of my machine 26 with a center gauge 64, which is preferably pivoted at 65, so that it can be swung up to the dotted position shown in Fig. 3, and, after it accomplishes its purpose, can be swung down out of the way, as shown in full lines in said figure. To get this correct center position it will be necessary to manipulate the nut 32 to actuate the pinion 31 and the rack 30 so as to get the proper transverse adjustment. The moment that this adjustment has been obtained then the face bow 6 is swung or pivoted until the spirit level 15 shows that it is horizontal.

To insure that the bite wax 23 will be held in the correct horizontal position I provide any suitable form of support or bed on the apparatus to support it in the position corresponding to the position in the patient's head. This position will be obtained when the spirit level 15 on the bow 6 is horizontal. In the particular embodiment of my invention shown I provide a plurality of yielding plungers 66, 66 normally moved upward by the spiral springs 67, 67. After these plungers 66, 66 contact with the bite wax 23 they are secured in their different positions by their respective set screws 68, 68, two of these set screws being shown in Fig. 1, the other two being hidden beneath the yoke 24.

To assist in securing the bite wax upon the bed or support formed by the plungers 66, 66 I may provide any suitable means. One form of such means is that shown in Fig. 3 wherein I employ a pivoted arm 69, pivoted on the pivot 70, its end being provided with a resilient pad 71. This pad is pressed yieldingly on the upper surface of the bite wax 23 by means of the springs 72, having one end secured to the pivoted arm 69 and the other end secured at 73 to the standard 27. It will, therefore, be seen that after the bite wax is located in this position on the machine it is ready to be cut or carved so that it will have the correct curve or plane of Spee. The method for cutting the bite wax will now be described.

By my invention I positively and accurately set certain adjustable mechanism of my apparatus to correspond with the different centers 4 and 5 (Fig. 6) of the different curves of Spee 2 and 3, respectively. Preferably, though not necessarily, the gauge for accomplishing this function is also employed as a knife to carve or otherwise form the different curves of Spee 2 and 3, respectively, in the bite wax 23 while it is held in the apparatus 25. Having determined and set the necessary portion of my apparatus to accurately correspond with the centers 4 and 5 of the curve of Spee I then use any proper implement moving about the respective centers of the curves of Spee, corresponding to 4 and 5 in Fig. 6, and accurately cut or otherwise from the curve of Spee in the bite wax held in the machine, as previously described. In my machine, with these centers 4 and 5 positively set and fixed very little skill or dexterity is required to properly cut the curve of Spee in the bite wax 23 because, at all times, the angle or radius of the cutting tool is controlled by moving about these fixed centers 4 and 5. It is, therefore, clear that there is no free-hand cutting, and consequently there is no marring of the bite wax by overcutting it requiring that the wax be built up with new wax and again cut, as is necessary in the practice of the most skilled practitioners today.

Of course, various forms of mechanism to positively locate and fix these centers of Spee 4 and 5 may be employed. In the particular form of my invention, shown in this case for carrying out my improved method, I employ a gauge 74 (Fig. 4) which is also, though not necessarily, a carving tool adapted to carve the curve of Spee 2 and 3 in the bite wax 23.

With more particular reference to Fig. 4, it will be seen that this gage is a hollow body member 75, provided with an axial bore 76, within which fits a goose neck rod 77, held in any desired adjustment by the thumb screw 78. On the curved end 79 of the gooseneck rod 77, is provided a recess 80, for a purpose to be more fully hereinafter described. When this gauge is also employed as a carving tool, as in the preferred construction, a knife 81 is secured on the end of the body member 75 by means of the thumb screw 82, having a screw-threaded portion 83, passing through the aperture 84 in the knife and co-operating with female threads within the bore 85 of the body member 75. To permit more ready manipulation of the gauge I also preferably provide it with a handle 86, secured to the body member by the screw 87.

It is now necessary to accurately fix the centers 4 and 5 (Fig. 6) of the curves of Spee 2 and 3 respectively in the apparatus 25 (Figs. 1 and 3). It is well-known in this art that these respective centers 4 and 5 of the curves of Spee are points on the sagittal plane of the body equi-distanced from the centers of their respective condyles 16, 16 and the mesio-incisal point of the bite wax 23. The distance from the center of the condyle 16 to the center 90 (Fig. 7) is the same as from the center of the condyle 16 to the center of the curve of Spee 4 or 5 as the case may be (Fig. 6). The fact that the distance between the center of the condyle 16 and the mesio-incisal point 90 of the bite wax 23 is a fixed and determinable distance, enables me to fix in my machine and by my method the center 4 (or 5 as the case may be) of the center of Spee which is an imaginary point in the head of the patient, as shown in Fig. 7.

By the aid of my gauge 74 I can positively locate and fix these respective centers 4 and 5 of the curves of Spee 2 and 3, respectively. Assuming that it is first desired to locate the center 5 of the curve of Spee 3 the tip 91 of the knife 81 is located in the depression 92 in the rod 41 (Fig. 2) corresponding to the true condyle centers. This depression 92 is located on the rod 41 approximately a half inch from the abutment 11 to compensate for bone and tissue of the patient. The gauge is adjusted by holding the tip 91 of the knife in the depression 92 in the rod 41 and then sliding the goose-neck 77 within the axial bore 76 until the tip of the goose-neck is brought opposite and in line with the center 90 of the bite wax 23. The goose-neck is then held in this adjusted position by screwing up the thumb screw 78. The gauge 78 will then be adjusted for the correct distance between the condyle 16 and the center 90 of the bite wax 23 (see Fig. 7).

Still holding the point of the knife 81 in the depression 92 of the rod 41 the gauge 74 is swung in the arc of a circle, corresponding to the circle 93 in the diagram of Fig. 7. The pivoted arm 49 with its adjustable member 58 is then rocked, on the bearing or brushing 47, and the member 58 pulled out or pushed in, as may be necessary, until its end 94 is received in the depression 80 of the goose-neck 79. The thumb screw 59 is then tightened so as to hold the member 58 in its correct adjusted position in the arm 49. The adjustment just referred to determines the side 95 of the equi-lateral triangle shown in dotted lines in Fig. 7. Keeping the end 94 in the depression 80, the arm 49 with the gauge 74 are together rotated in the arc of a circle 93 (Fig. 7) until the point 91 of the knife 81 coincides with the mesio-incisal point 90 in the bite wax 23. The thumb screw 52 is then tightened so as to hold the arm 49 with its adjustable member 58 in this adjusted position. This adjustment gives us, in the machine, the center 5 of the curve of Spee 3, which is then fixed, the end 94 of the member 58 coinciding with and being the center of the curve of Spee 5, shown in the diagram of Fig. 6.

Having therefore established the center 5 of the curve of Spee 3, it is then a simple matter to cut the curve of Spee 3 (Fig. 6) on the bite wax 23 by manipulating the knife 81 always, however, having it resting upon the end 94 of the adjustable member 58 which will insure the accurate cutting of the curve of Spee 3. The pivot of the gauge 74 on the arm 58 is in effect, a universal joint.

After cutting the curve of Spee 3 the center 4 of the other curve of Spee 2 is located on the machine in the same manner as that previously described, it being understood that the gauge would have to be slightly readjusted, and that instead of using the arm 49, with the adjusting arm 58, the arm 48 with the adjustable member 55 would be employed, so that the end of that arm 95 would then be adjusted to correspond with the center 4 of the curve of Spee 2 (Fig. 6). The other side of the bite wax 23 would then be carved to form its curve of Spee 2; the two carvings which can be done very quickly, completing the cutting or carving of the bite wax 23 so that, while the patient is still waiting, the bite wax can be adjusted in his mouth without the necessity of another visit for that purpose, as is necessary in the art today.

In some cases where there is malformation of the jaw of the patient from various causes, the jaw is not uniform and consequently the thickness of the bite wax at the point of insertion for the artificial teeth will not be thick or strong enough to hold the teeth. I have shown in Figs. 10 and 11 an instrument which I employ, in such cases, to more readily determine this thickness so that a line may be made on the exterior of the bite wax to enable the operator, when carving the curve of Spee, to vary this curve to compensate for the irregularity of the jaw of the patient. For example, in Fig. 10 I have illustrated a bite wax 96 of a patient having a malformed jaw. It will be noted that this bite wax at 97 is of the ordinary required thickness. On the other side of the bite wax indicated, by the dotted line 98, it will be seen that, due to a malformed jaw, the thickness of the bite wax is not sufficient to hold and sustain the artificial teeth in the denture to be reproduced from the bite wax.

I have shown in this Fig. 10 a gauge 100 which in effect is an ordinary pair of calipers pivoted on the screw 101 with the addition of the arm 102, one end of which 103 is pivoted at 104 to the caliper arm 105. This arm 103 is also pivoted on the screw or pivot 101 and is provided with a pointer 106. It will be seen that when the caliper arms 105 and 107 are used to measure the depression in the bite wax 96, the pointer 106 being fastened to the arm 105 and moving with it, will point to a point outside of the bite wax corresponding to the depth of the depression on the other side. The operator can then make a mark on the bite wax which he will follow in carving the bite wax and make suitable allowance for the curve of Spee in this depression. That is, when the operator carves the line of Spee, adjacent to this depression, he will carve a curve which is harmonious to the curve of Spee, and will allow sufficient thickness in the bite wax for holding the artificial tooth in the denture at that point.

Having thus described this invention in connection with illustrative embodiments thereof, to the details of which I do not desire to be limited, what is claimed as new and what is desired to secure by Letters Patent is set forth in the appended claims.

I claim—

1. The method of manufacturing artificial dentures, consisting in placing the bite wax in the patient's mouth, determining the condyle axis of the patient, then determining the mesio-incisal point in the bite wax, removing the bite wax from the patient's mouth, measuring the distance from a point corresponding with relation to the bite wax to one condyle of the patient to the mesio-incisal point in the bite wax, then measuring on the sagittal plane corresponding to that of the patient the same distance from a point corresponding to his said condyle, and the mesio-incisal point to obtain the center of the particular curve of Spee desired, and shaping the bite wax with a tool moving about the center of the curve of Spee to quickly and accurately form the particular curve of Spee on the bite wax, then measuring from a point corresponding to his other condyle to the mesio-incisal point, then measuring on the sagittal plane corresponding to that of the patient a point equally distant from a point corresponding to that condyle and the mesio-incisal point to obtain the center of the other or second curve of Spee, and shaping the other side of the bite wax with a tool moving about the particular center of the curve of Spee on that side of the patient's mouth, to quickly and accurately form the other curve of Spee in the bite wax, so that the bite wax will then have both curves of Spee and can be immediately tested in the mouth of the patient without delay.

2. The method of manufacturing artificial dentures, consisting in placing the bite wax in the patient's mouth, having him bite on said wax while the wax is in a certain plane with relation to a point corresponding to the center of the curve of Spee, removing the bite wax from the patient's mouth and forming the curve of Spee in said bite wax by means of a knife movable universally about said center of the curve of Spee while the bite wax is held in the same plane with relation to the center of the curve of Spee as when in the mouth of the patient.

3. An apparatus for the manufacture of artificial dentures, consisting of a base, an adjustable arm supported by the base, a portion of the arm being adapted to be adjusted to correspond with the center of the curve of Spee of any particular patient, and a shaping tool adapted to be controlled by the portion of the arm that corresponds with the center of the curve of Spee of the patient to permit the shaping-tool to be moved universally about said center.

4. An apparatus for the manufacture of artificial dentures, consisting of a base, means on the base to support a bite wax, means supported by the base adapted to be adjusted to correspond with the center of the curve of Spee of any particular patient, and means mounted for universal movement to form the curve of Spee in the bite wax, said means being controlled by the preceding means.

5. An apparatus for the manufacture of artificial dentures, consisting of a base, an adjustable arm supported by the base, the end of the arm being adapted to be adjusted to correspond with the center of the curve of Spee of any particular patient, and a shaping tool adapted to be pivoted on the end of the arm for universal movement to form the curve of Spee in the bite wax.

6. An apparatus for the manufacture of artificial dentures, consisting of a base, a support for the denture, a standard, a hollow tube mounted in the standard, means to move the hollow tube laterally, slide rods mounted in the tube adapted to co-operate with a face bow to position the condyle axis in the apparatus, a face bow, one or more adjustable arms mounted on the standard a portion of the arms corresponding to the center of the particular curve of Spee desired to be formed in the bite wax, and means co-operating with the arms to form the curve of Spee in the bite wax.

7. A new article of manufacture for assisting in determining the curve of Spee consisting in a combined gauge and carving tool having an adjustable arm, one end of which is adapted to be pivoted at a point corresponding to the center of the curve of Spee.

8. A new article of manufacture for assisting in determining the curve of Spee consisting in a combined gauge and carving tool having an adjustable goose neck, one end of which is adapted to be pivoted on a point corresponding to the center of the curve of Spee.

9. In an apparatus for the manufacture of artificial dentures consisting of a base, and a plurality of plungers forming an adjustable bed or support for a bite wax.

10. In an apparatus for the manufacture of artificial dentures consisting of a base, and an adjustable bed or support for a bite wax, and yielding means to hold the bite wax on said bed or support.

11. An apparatus for the manufacture of artificial dentures, consisting of a base, a standard, a hollow tube mounted in the standard, a rack mounted on the tube, a pinion co-operating with the rack to move it transversely to the standard, a thumb nut controlling the movement of the pinion; two slide rods mounted in the hollow tube, means to secure them in different positions in the hollow tube, two arms pivoted on the standard, each arm provided with an adjustable extension, means to secure the arms in any adjusted position, the ends of the arms being adapted to be adjusted to correspond to the center of the curves of Spee of the particular patient.

12. An apparatus for the manufacture of artificial dentures, consisting of a base, a standard, a hollow tube mounted in the standard, a rack mounted on the tube, a pinion co-operating with the rack to move it transversely to the standard, a thumb nut controlling the movement of the pinion; two slide rods mounted in the hollow tube, means to secure them in different positions in the hollow tube, two arms pivoted on the standard, each arm provided with an adjustable extension, means to secure the arms in any adjusted position, the ends of the arms being adapted to be adjusted to correspond to the center of the curves of Spee of the particular patient, a face bow having adjustable abutments to co-operate with the ends of the slide rods, a bite wax carried by the face bow, and means co-operating with the extension arms to form the curve of Spee in the bite wax.

13. A new article of manufacture for indicating the variation to be made in the curve of Spee for irregularity or malformation of the jaw of the patient, consisting of two pivoted arms, and a third arm pivoted on the same pivot as the two arms, one end of the third arm being secured to one of the other arms, the other end being a pointer.

14. A new article of manufacture for indicating the variation to be made in the curve of Spee for irregularity or malformation of the jaw of the patient, consisting of a pair of calipers provided with a third pivoted arm, having a pointer at one end and pivoted at its other end to one of the caliper arms.

15. Apparatus for the manufacture of artificial dentures comprising a base, a plurality of upwardly spring pressed plungers forming a support for a bite wax or other model, and means for individually holding said plungers in any desired position against the tension of their springs.

16. The method of forming a curve in a bite wax corresponding to the curve of Spee of the patient after the bite wax has been removed from the patient's mouth which comprises fixing a point with relation to the bite wax corresponding to the center of the curve of Spee of the patient, and carving the bite wax to form said curve therein by moving a carving blade universally about said point.

17. The method of manufacturing artificial dentures which comprises placing a bite wax in the patient's mouth and having him bite on the wax, determining the condyle axis of the patient and the center of the curve of Spee, removing the bite wax from the patient's mouth while maintaining it supported in the same position with relation to a line corresponding to the condyle axis of the patient and to a point corresponding to the center of the curve of Spee as when it was in the patient's mouth, and carving the bite wax to form a curve therein corresponding to the curve of Spee of the patient by moving a carving blade universally with relation to said point as a center.

18. Apparatus for forming a curve in a bite wax corresponding to the curve of Spee of the patient after the bite wax has been removed from the patient's mouth, comprising a knife blade, and means for suspending the knife blade from a point corresponding with relation to the bite wax to the center of the curve of Spee of the patient so as to permit the knife blade to be moved universally about said point to carve said curve in the bite wax.

EDWARD D. RALPH.